(12) United States Patent
De Zwart et al.

(10) Patent No.: US 7,370,987 B2
(45) Date of Patent: May 13, 2008

(54) DISPLAY PANEL COMPRISING A LIGHT GUIDE PLATE

(75) Inventors: Siebe Tjerk De Zwart, Eindhoven (NL); Peter Alexander Duine, Eindhoven (NL); Antonius Hendricus Maria Holtslag, Eindhoven (NL); Gerrit Oversluizen, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 716 days.

(21) Appl. No.: 10/514,592

(22) PCT Filed: Apr. 22, 2003

(86) PCT No.: PCT/IB03/01693

§ 371 (c)(1),
(2), (4) Date: Nov. 16, 2004

(87) PCT Pub. No.: WO03/098317

PCT Pub. Date: Nov. 27, 2003

(65) Prior Publication Data

US 2005/0174507 A1    Aug. 11, 2005

(30) Foreign Application Priority Data

May 21, 2002    (EP)    ................... 02076981

(51) Int. Cl.
*G09F 13/04*    (2006.01)

(52) U.S. Cl. ................... 362/97; 362/600; 362/606; 362/616; 349/65; 349/70

(58) Field of Classification Search ................ 362/97, 362/606, 607, 616; 349/65, 70; 345/75.1
See application file for complete search history.

(56) References Cited

U.S. PATENT DOCUMENTS

| 4,723,834 | A  | * | 2/1988  | Van de Venne et al. .... 359/223 |
| 6,195,196 | B1 | * | 2/2001  | Kimura et al. .............. 359/295 |
| 6,628,246 | B1 | * | 9/2003  | Van Gorkom ................ 345/30 |
| 6,642,913 | B1 | * | 11/2003 | Kimura et al. ................ 345/84 |
| 6,644,822 | B2 | * | 11/2003 | Kumagai ...................... 362/26 |
| 2001/0043171 | A1 | * | 11/2001 | Van Gorkom et al. ..... 345/75.1 |

* cited by examiner

*Primary Examiner*—Ali Alavi
*Assistant Examiner*—Evan Dzierzynski
(74) *Attorney, Agent, or Firm*—Paul Im

(57) ABSTRACT

The display panel (21) comprises a light guide (2), a second plate (4) and a movable element (3) between both plates for locally decoupling light out of the light guide (2). Voltages, applied to electrodes (5,6 resp. 25), associated with the light guide (2), the second plate (4) and the movable element (3), locally bring the movable element (3) into 5 contact with the light guide plate (2) or the second plate (4). If, between the light guide (2) and the first electrodes (5) a layer (51) is present with a second refractive index being smaller than the first refractive index of the light guide (2), and the light guide (2) is positioned between the first electrodes (5) and the movable element (3), absorption of the light transported through the light guide plate (2) is reduced, providing a display panel (21) with 10 improved power efficiency.

4 Claims, 3 Drawing Sheets

DISPLAY PANEL COMPRISING A LIGHT GUIDE PLATE

The invention relates to a display panel comprising
a light guide, having a first refractive index,
a second plate facing the light guide,
first electrodes and second electrodes, associated with the light guide and the second plate, respectively, and
a movable element provided with a third electrode, between the light guide and the second plate, for locally decoupling light out of the light guide,
the electrodes being present for locally bringing the movable element into contact with the light guide by the application of voltages to the electrodes.

An embodiment of the display panel of the type mentioned in the opening paragraph is known from WO 99/28890.

The known display panel comprises a light guide in the form of a light guide plate, in which, in operation, light, generated by a light source, is trapped so that this plate forms a light guide. First and second electrodes are positioned at the surface of the light guide plate facing the movable element and at the surface of the second plate facing the movable element, respectively. By the application of voltages to the first and second electrodes and the third electrode, the movable element is locally brought into contact with or set free from the light guide plate. Insulating layers are present on the surface of the first and second electrodes facing the movable element to prevent direct electrical contact between the first and second electrodes on the one hand and the third electrode on the other hand.

A drawback of the known display panel is that a relatively small portion of the light coupled into the light guide plate is available for being locally decoupled out of the light guide plate because a relatively large portion of the light coupled into the light guide plate is absorbed during transport through the light guide plate. Therefore the known panel requires, in operation, relatively much energy to operate a light source producing a relatively large amount of light.

It is an object of the invention to provide a display panel of the kind mentioned in the opening paragraph, having an improved power efficiency, i.e. the same amount of light is available for being locally decoupled out of the light guide at a reduced power. The object is thereby achieved in that between the light guide and the first electrodes a layer is present with a second refractive index being smaller than the first refractive index, and the light guide is positioned between the first electrodes and the movable element.

The invention is based on the insight that the absorption of light by the first electrodes, during transport of light through the light guide, is reduced if only a portion of the light guided by the light guide plate reaches the first electrodes. A portion of the light is already reflected before reaching the first electrodes, if a layer is introduced with a second refractive index smaller than the first refractive index. This is in contrast to the display panel known from WO 99/28890 where the light guided by the light guide plate reaches the first electrodes because the first electrodes are positioned on the surface of the light guide plate. Furthermore, as now the insulating layer on the surface of the first electrodes facing the movable element can be omitted, no light is absorbed in the insulating layer.

The layer of e.g. 2 micrometer thickness, may contain solid material, e.g. a silicon resin with a refractive index of about 1.4, which is smaller than the refractive index of about 1.5 for a light guide of e.g. ordinary glass or kwartz. However, if the layer comprises a gaseous layer or vacuum, it is e.g. an air gap. A vacuum gap is also possible. Then the first electrodes are free from contact with the light guide. The first electrodes can be provided by metal wires or strips running beside one another. However, if the first electrodes are carried by a third plate, the first electrodes are at a fixed position at the third plate. If desired, this third plate can be aligned with respect to the light guide plate.

In an embodiment a surface of the movable element facing the second plate is provided with an insulating layer, obviating the dielectric layer on the second electrodes at the second plate.

These and other aspects of the invention will be further elucidated and described with reference to the drawings, in which.

The Figures are schematic and not drawn to scale and in all the figures same reference numerals refer to corresponding parts.

Figure 1:
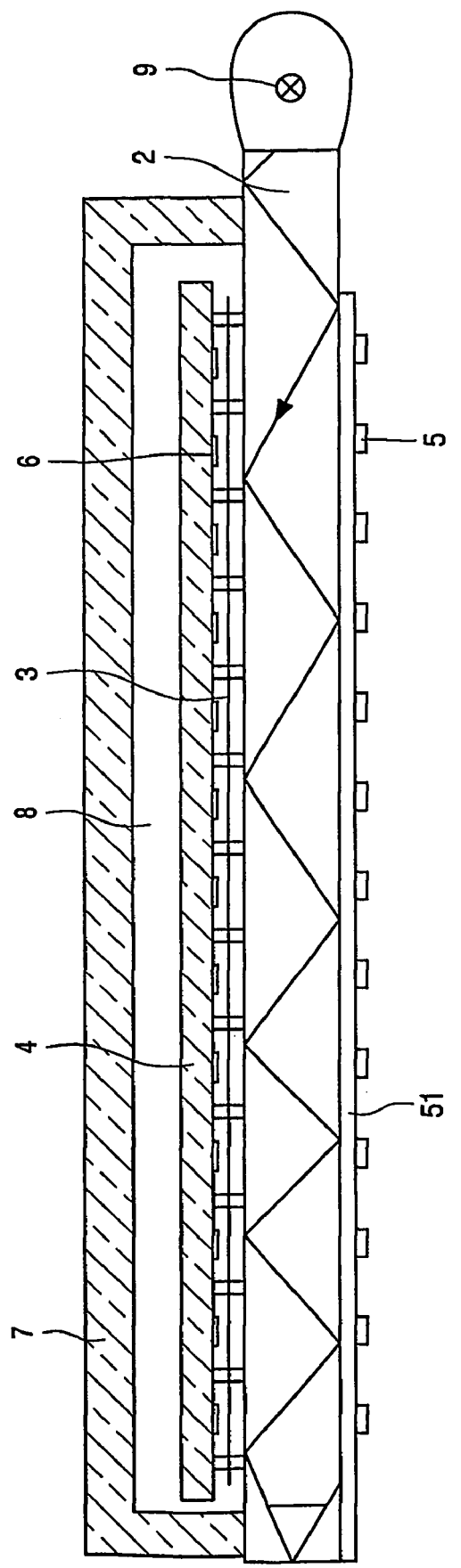
FIG. 1 shows schematically a cross sectional view of the display panel.

In FIG. 1 the display panel 21 comprises a light guide 2, a movable element 3, a second plate 4 and a layer 51. First electrodes 5 are arranged on the side of the layer 51 facing away from the light guide 2. The layer 51 has a refractive index smaller than the refractive index of the light guide. Second electrodes 6 are arranged on the second plate 4 facing the movable element 3. A covering element 7 is connected to the light guide 2, thus forming a space 8. The display panel 21 further comprises a light source 9. Light generated by the light source 9 is coupled into the light guide 2.

Figure 2:
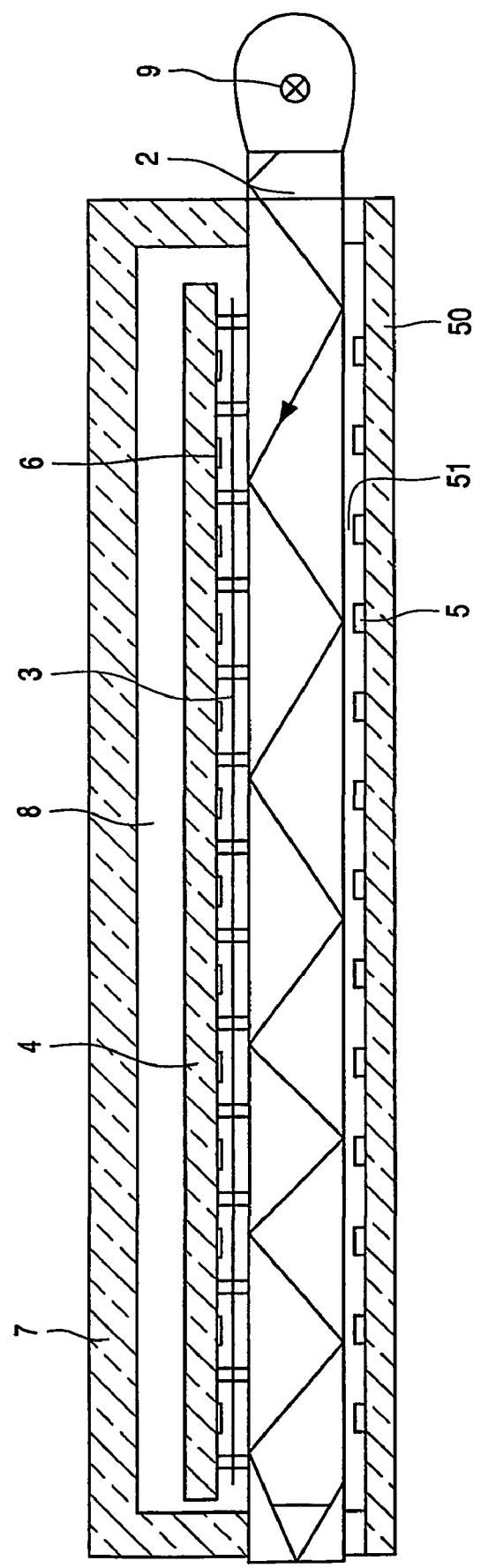
FIG. 2 shows schematically a cross sectional view of the display panel.
Figure 3:
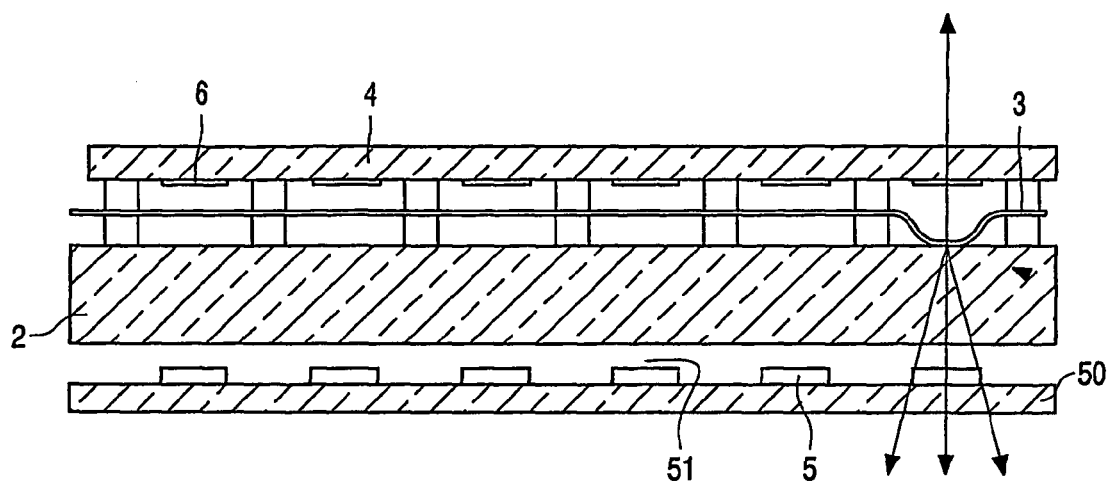
FIG. 3 shows schematically a portion of the display panel.

In FIG. 2 the layer 51 comprises a gaseous layer, e.g. an air gap. The display panel 21 further comprises a third plate 50. The first electrodes 5 are arranged on the side of the third plate 50 facing the light guide. The third plate 50 can be omitted if for instance the first electrodes 5 are provided by metal wires or strips running beside one another. The light, coupled into the light guide 2, travels inside the light guide 2 and, due to internal reflection, cannot escape from the light guide 2 unless the situation as shown in FIG. 3 occurs. FIG. 3 shows the movable element 3 locally lying against the light guide 2. In this state, part of the light enters the movable element 3. The movable element 3 scatters the light, so that it leaves the display panel 21. In FIG. 3, this is indicated by means of straight arrows.

Figure 4:
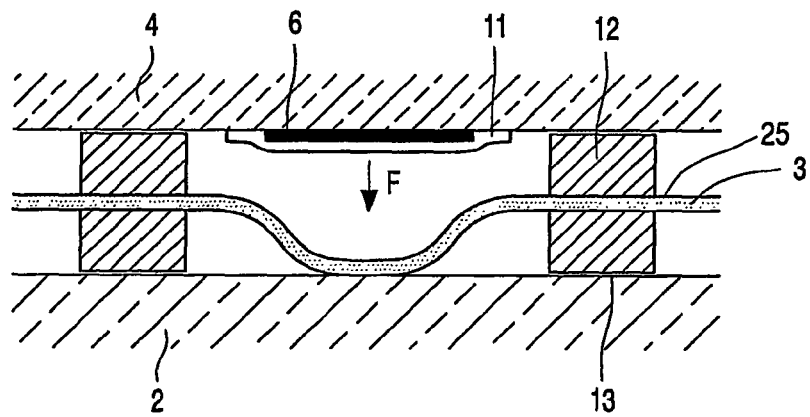
FIG. 4 shows schematically a portion of the display panel.
Figure 5:
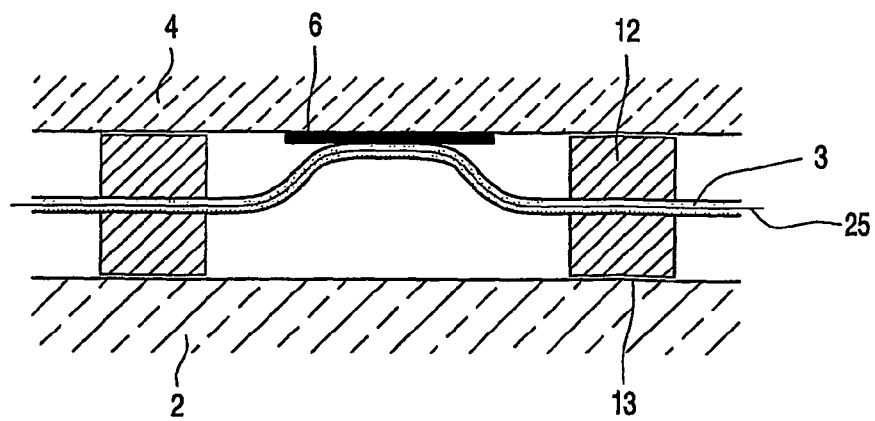
FIG. 5 shows schematically a portion of the display panel.

In FIG. 4 the movable element 3 is positioned between the light guide 2 and the second plate 4 by means of spacers 12 and 13. A third electrode 25 is part of the movable element 3. The third electrode 25 can be present on the side of the movable element 3 facing the light guide 2, on the side of the movable element 3 facing the second plate 4 or even be part of the bulk of the movable element 3. By the application of voltages to the first and second electrodes 5,6 and the third electrode 25 on the movable element 3, an electric force F is generated which presses the movable element 3 against the light guide 2. The contact between the movable element 3 and the light guide 2 causes light to leave the light guide 2 and enter the movable element 3 at the location of the contact. In the movable element 3, the light is scattered and leaves the display panel 21. In FIG. 4 the third electrode 25 is present at the surface of the movable element 3 facing the second plate 4. Therefore, the second electrodes 6 are covered by an insulating layer 11 in order to preclude direct electric contact between the third electrode 25 and the second electrodes 6. The insulating layer 11 is not necessary if the movable element 3 is insulating at the surface facing the second plate 4. The third electrode 25 is then for instance embedded in the movable element, as shown in FIG. 5, or at the surface of the movable element 3 facing the light guide plate 2.

The invention claimed is:

1. A display panel comprising
a light guide, having a first refractive index,
a second plate facing the light guide,
first electrodes and second electrodes, associated with the light guide and the second plate, respectively, and
a movable element provided with a third electrode, between the light guide and the second plate, for locally decoupling light out of the light guide,
the electrodes being present for locally bringing the movable element into contact with the light guide by the application of voltages to the electrodes,
characterized in that between the light guide and the first electrodes a layer is present with a second refractive index being smaller than the first refractive index, and the light guide is positioned between the first electrodes and the movable element.

2. A display panel as claimed in claim 1 characterized in that the layer comprises a gaseous layer or vacuum.

3. A display panel as claimed in claim 2 characterized in that the first electrodes are carried by a third plate.

4. A display panel as claimed in claim 1 characterized in that a surface of the movable element facing the second plate is provided with an insulating layer.

* * * * *